United States Patent [19]
Baurecht et al.

[11] 3,986,888
[45] Oct. 19, 1976

[54] PROCESS FOR THE PREPARATION OF THE β-MODIFICATION OF TETRABROMO-8,8'-DIHYDROXYNAPTHAZINE IN PIGMENT FORM

[75] Inventors: Heinz-Ewald Baurecht; Reinhold Hörnle, both of Cologne, Germany

[73] Assignee: Bayer Aktiengesellschaft, Leverkusen, Germany

[22] Filed: July 25, 1975

[21] Appl. No.: 599,018

[30] Foreign Application Priority Data
Aug. 3, 1974   Germany............................ 2437526

[52] U.S. Cl.............................. 106/288 Q; 106/309
[51] Int. Cl.².......................................... C08K 5/34
[58] Field of Search....................... 106/288 Q, 309; 260/266, 267

[56] References Cited
UNITED STATES PATENTS
3,833,536   9/1974   Steinbeck et al. .................. 260/266

FOREIGN PATENTS OR APPLICATIONS
1,812,004   6/1970   Germany ....................... 106/288 Q Primary Examiner—Winston A. Douglas
Assistant Examiner—J. V. Howard
Attorney, Agent, or Firm—Plumley and Tyner

[57] ABSTRACT

The conversion of the α-modification of the tetrabrom-8,8'-dihydroxynaphthazine into the β-modification and the conditioning to a deeply colored, easily dispersible pigment can be performed in one process step by a salt kneading process in the presence of an inorganic or organic salt which is soluble in water or in aqueous acids or bases, of an organic solvent which does not significantly dissolve either the salt or the pigment and of an aromatic solvent.

1 Claim, No Drawings

PROCESS FOR THE PREPARATION OF THE β-MODIFICATION OF TETRABROMO-8,8'-DIHYDROXYNAPTHAZINE IN PIGMENT FORM

It is known from German Offenlegungsschrift (German Published Specification) 1,812,004 that tetrabromo-8,8'-dihydroxynaphthazine occurs in two modifications.

The α-modification characterised by lattice plane spacings of the strongest X-ray reflections at 3.40, 4.78, 13.18, 3.30 and 6.81 A, with an intensity ratio of 100:70:60:50:30, is obtained from sulphuric acid and is itself a valuable pigment, but shows an undesired tendency to undergo post-crystallisation in aromatic solvents (that is to say, it has low stability to aromatics).

The β-modification, characterised by lattice plane spacings of the strongest X-ray reflections of 3.34, 5.11, 4.28, 3.13 and 2.90 A, with an intensity ratio of 100:40:40:35:35, shows a lesser bluish tinge, and greater clarity, in alkyld resin lacquers than does the α-modification, and at the same time has good stability to aromatics and good fastness to light. Accordingly, the β-modification is the technicologically desirable form of the pigment.

It is known from German Offenlegungsschrift (German Published Specification) 1,812,004 that the β-modification is not obtained directly but is obtained from the α-modification by treatment with organic solvents at temperatures between 80° and 240° C. To comminute it, the coarsely crystalline β-modification is then additionally subjected to grinding with salt.

As described in Example 5 of German Offenlegungsschrift (German Published Specification) 1,812,004, it is however not possible to convert the α-modification completely into the β-modification merely by grinding with salt in the presence of hydrophobic organic solvents with toluene, xylene, chlorobenzene or nitrobenzene, even after a grinding time of 50 hours. Instead, mixtures of the modifications, with varying α:β ratios, are always obtained, and these mixtures are inferior to the pure β-modification both tinctorially and with regard to stability to aromatics.

As described above, it has hitherto been necessary to use a two-stage process, which comprises a step of modification transformation and a step of conditioning, in order to prepare the pure β-modification of tetrabromo-8,8'-dihydroxynaphthazine in pigment form.

Suprisingly, a process has now been found for carrying out the complete conversion to the β-modification, and the conditioning to give a deeply coloured, easily dispersible pigment, in one process step.

The process is characterised in that 1 part by weight of the α-modification of tetrabromo-8,8'-dihydroxynaphthazine is kneaded with salt at temperatures between 30° and 300° C in the presence of 0.2 – 20 parts by weight, preferably 0.5 – 6 parts by weight, of an inorganic or organic salt which is soluble in water or in aqueous acids or bases, 0.1 – 3 parts by weight, preferably 0.2 – 2 parts by weight of a solvent, preferably of an organic solvent which does not significantly dissolve either the salt or the pigment, and at least 0.005 part by weight, preferably at least 0.01 part by weight, of an aromatic solvent which is liquid under the kneading conditions and effects the transformation. The kneading time is about 10 seconds to 10 hours, preferably 20 seconds to 5 hours. Examples of aromatic solvents according to the invention which effect the transformation of the α-modification to the β-modification are aromatic hydrocarbons, halogenated and nitrated aromtic hydrocarbons, aniline as well as nuclear-substituted and/or N-substituted anilines, phenols and substituted phenols, phenol esters and esters of aromatic carboxylic acid, tertiary aromatic amines such as pyridine or quinoline or their derivatives. The following may be mentioned as examples: benzene, toluene, xylenes, chlorobenzene, o-dichlorobenzene, nitrobenzene, o-chlorotoluene, aniline, toluidine, N-methylaniline, N,N-dimethylaniline, phenol, o-cresol, phenol acetate, benzoic acid methyl ester, benzoic acid ethyl ester, salicylic acid methyl ester and p-nitroaniline.

Suitable solvents are those which have a boiling point above 140° C and which are liquid under the kneading conditions. Particularly suitable solvents are those which are at least slightly soluble in water or dilute aqueous acids or bases, such as polyhydric aliphatic alcohols, for example ethylene glycol, propylene glycol or glycerol, ethanolamines, phenols, anilines, polyethylene glycols, propylene glycols, monoesters and monoethers of polyethylene glycols and polypropylene glycols, polyethyleneamines, N-alkylated and N-hydroxyalkylated polyethyleneimines, N-monosubstituted and N-disubstituted anilines, possible substituents being alkyl, hydroxyalkyl, alkoxyalkyl, polyalkoxyalkyl, alkylaminoalkyl and polyalkylaminoalkyl groups, of which the polyalkoxy and polyalkylamine parts are derived from ethylene oxide, propylene oxide, ethyleneimine or propyleneimine. In addition, there should be mentioned silicone oils, phosphoric acid amides and phosphoric acid esters and salt melts consisting of salts and salt mixtures, for example aluminium chloride and zinc chloride.

Examples of suitable inorganic and organic salts are sodium chloride, potassium chloride, sodium sulphate, zinc chloride, aluminium chloride, aluminium sulphate, calcium carbonate, sodium acetate, potassium sodium tartrate, calcium acetate or sodium citrate.

The kneading auxiliary can be identical with the auxiliary which effects the transformation.

EXAMPLE 1

120 g of tetrabromo-8,8'-dihydroxynaphthazine in the α-modification, prepared according to one of the methods described in German Offenlegungsschrift (German Published Specification) 1,812,004, 240 g of NaCl and 6 g of o-dichlorobenzene are kneaded with 75 g of ethylene glycol for 1 hour in a 250 ml four-arm kneader at 40° – 70° C. The kneaded mass is suspended in 1.2 l of hot water and the pigment is filtered off, washed until free from salt and dried at 80° C.

A clear, deeply coloured and easily dispersible pigment is obtained, which is entirely in the β-modification and is outstandingly suitable for use in car lacquers.

EXAMPLE 2

If kneading is carried out as in Example 1 but without addition of o-dichlorobenzene, no transformation to the β-modification takes place even at a kneading temperature of 130° C.

EXAMPLE 3

120 g of tetrabromo-8,8'-dihydroxynaphthazine in the α-modification, prepared according to one of the methods indicated in German Offenlegungsschrift (German Published Specification) 1,812,004, 240 g of NaCl, 12 g of aniline and 53 g of diethylene glycol are kneaded for 2 hours at 110° – 125° C in a 200 ml four-arm kneader. The kneaded mass which issues is suspended in 1.5 l of 5% strength HCl and the pigment is filtered off, washed until free from chloride and dried at 80° C.

The pigment thus obtained is entirely in the β-modification and has similar properties to those of a pigment which was prepared according to Example 1.

If kneading is carried out as described above but at 50° – 75° C, no transformation of the α-modification takes place.

EXAMPLE 4

120 g of tetrabromo-8,8'-dihydroxynaphthazine in the α-modification, 240 g of NaCl, 12 g of 4-nitroaniline and 60 g of ethylene glycol are kneaded for 1 hour in a 250 ml four-arm kneader at 70° – 85° C. The kneaded mass which issues is suspended in 1.5 l of 5% strength HCl and the pigment is filtered off hot, washed until free from chloride and dried at 80° C.

The pigment thus obtained is entirely in the β-modification and has similar properties to those of a pigment which was prepared according to Example 1.

If instead of 12 g of 4-nitroaniline, 8 g of N,N'-dimethylaniline are used in the kneading process, and in other respects the process is carried out as described above, the pigment thus obtained has the same properties.

EXAMPLE 5

If, in Example 1, the o-dichlorobenzene is replaced by the same amount of nitrobenzene or o-xylene, the same results are obtained.

We claim:

1. Process for the preparation of the β-modification of tetrabromo-8,8'-dihydroxynaphthazine in pigment form, characterised in that the α-modification of tetrabromo-8,8'-dihydroxynaphthazine is kneaded with salt at temperatures between 30° and 300° C in the presence of 0.2 – 20 parts by weight of an inorganic or organic salt which is soluble in water or in aqueous acids or bases, 0.1 – 3 parts by weight of a solvent which does not significantly dissolve either in salt or the pigment, and 0.005 part to 3 parts by weight of an aromatic solvent which is liquid under the kneading conditions.

* * * * *